July 23, 1940.   O. M. KNIGHT ET AL   2,208,904
SPEED INDICATING GOVERNOR FOR MOTOR VEHICLES
Filed March 31, 1938   2 Sheets-Sheet 1
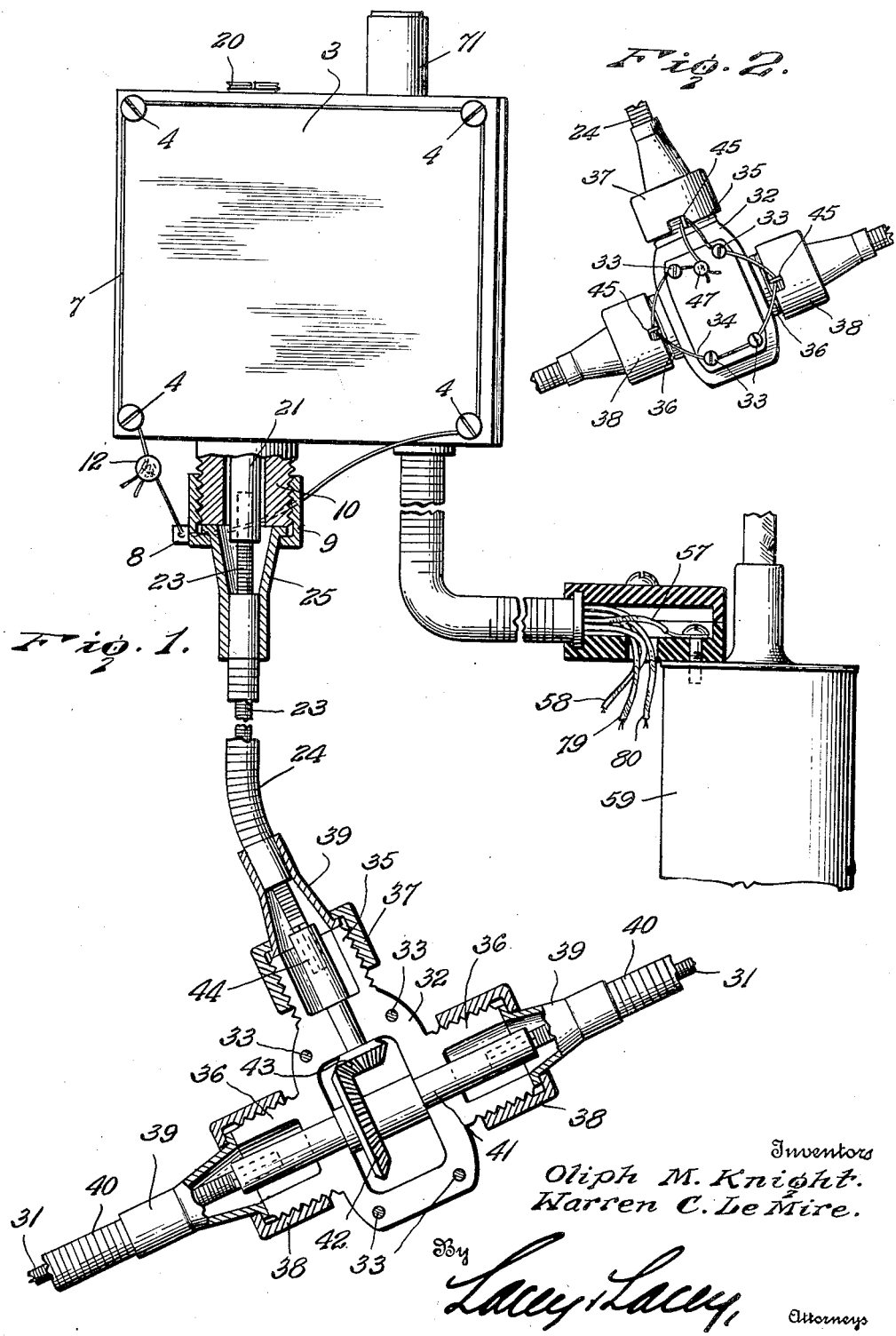
Inventors
Oliph M. Knight
Warren C. LeMire
By Lacey & Lacey, Attorneys

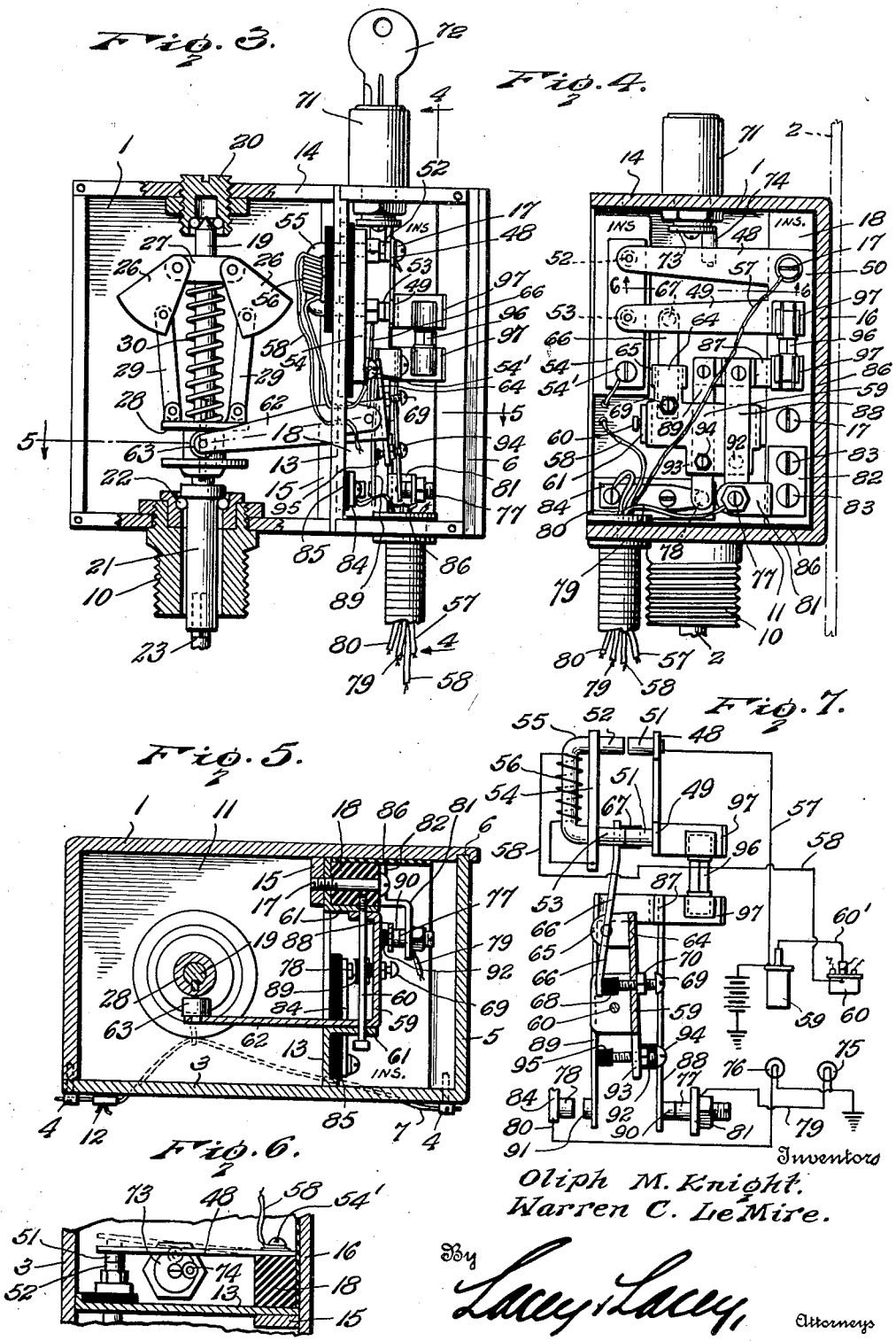

Patented July 23, 1940

2,208,904

UNITED STATES PATENT OFFICE 2,208,904

SPEED INDICATING GOVERNOR FOR MOTOR VEHICLES

Oliph M. Knight and Warren C. Le Mire, Miami, Fla.

Application March 31, 1938, Serial No. 199,286

6 Claims. (Cl. 200—80)

This invention relates to a speed-indicating governor for motor vehicles, and one object of the invention is to provide a device of this character which will serve very effectively as means for indicating the speed at which an automobile or other motor vehicle is traveling and also constitute means for cutting off flow of current for the ignition system and thus preventing operation of the motor if the driver of the motor vehicle attempts to exceed a predetermined speed limit.

At the present time traffic regulations of certain cities permit different rates of speed in different sections of the city, and in order to accurately determine whether a motor vehicle is being driven in excess of a prescribed speed limit, it is necessary for a police officer to drive a motorcycle or police scout car at such a speed that he can catch up to the vehicle and then trail it for a prescribed distance while observing his own speedometer. Many motorists avoid arrest for exceeding the speed limit by reducing speed when they see a pursuing police officer through a rear view mirror so that by the time the officer catches up with them they are traveling at the prescribed rate of speed.

Therefore, another object of the invention is to provide a speed-indicating governor which will not only break the ignition circuit when attempting to drive at an excessive speed greater than that allowed in any portion of a city but also serve to cause readily distinguishable signal lights to be individually illuminated when traveling at certain speeds. It will thus be seen that in a district restricted to slow speed a certain light may be illuminated and this light extinguished and another illuminated when speed allowed in another district is driven. It is then only necessary for a traffic officer to note by sight the signal light which is illuminated in order to determine whether an automobile is being driven higher than the speed allowed in a particular section of a city.

Another object of the invention is to provide a governor so constructed that it may be adjusted to break the ignition circuit at a lower rate of speed when a juvenile son or daughter is driving an automobile than that at which the circuit will be broken when adults are using the car. It will thus be seen that, when a parent does not desire a son or daughter to drive the automobile at the full speed permitted by traffic regulations, the governor may be set to break the ignition circuit at a reduced speed by means of a key which will be kept by the parent and when the parent is to drive the automobile the governor may be adjusted to permit driving at the full speed allowed by traffic regulation.

Another object of the invention is to provide a governor of the character set forth adapted to be coupled with and driven from the speedometer shaft and thus cause the governor to operate in conjunction with the speedometer and in addition permit tests to be made in order to determine whether or not the speeds indicated by the signal lights are correct and also determine whether or not the ignition circuit will be broken and operation of the motor stopped at a certain speed.

The invention is illustrated in the accompanying drawings, wherein:

Figure 1 is a view partially in elevation and partially in section showing the improved governor installed for use, Figure 2 is a view in elevation of the coupling between the speedometer shaft and the governor shaft, Figure 3 is a view showing the governor with a closure for its casing removed and certain portions in section, Figure 4 is a sectional view taken along the line 4—4 of Figure 3, Figure 5 is a sectional view taken along the line 5—5 of Figure 3, Figure 6 is a fragmentary view taken along the line 6—6 of Figure 4, and Figure 7 is a diagrammatic view showing the wiring and the signal light for indicating speeds at which a motor vehicle is traveling.

This improved speed control governor is installed at any convenient place in the automobile or other motor vehicle and has a casing 1 which may be formed of brass or any other desired material. The casing is preferably secured against the dash 2 and is open at its outer side and at one end, the outer side and open end of the casing being normally closed by a closure plate 3 which is secured in closing relation to the open side of the casing by screws 4 and has an extension 5 which closes the open end of the casing and is engaged in a groove or seat 6. This is clearly shown in Figure 5, and referring to Figures 1 and 5, it will be seen that, when the screws 4 are screwed tightly into place and a sealing wire 7 applied by threading it through the screws, unauthorized removal of the screws and tampering with the mechanism within the casing will be prevented. The sealing wire is not only threaded through the screws 4 but is also passed through an ear 8 carried by a coupling nut 9 which is threaded upon a nipple or neck 10 screwed into an opening formed in the lower wall 11 of the casing, and from an inspection of Figure 1, it will be seen that, when the sealing disk 12 is applied to ends of the sealing wire, removal of the threaded cap or coupling 9 will be prevented as well as removal of the screws 4. A partition 13 which is also preferably formed of brass is mounted in the casing to divide the casing into a relatively large compartment in which the governor is mounted and a relatively small compartment in which contact mechanism is mounted. This partition extends the full depth of the casing between the lower wall 11 and the upper wall 14 thereof and is secured against a strip 15 which extends against the inner wall 16 between the upper and lower walls, and from an inspection of Figure 5, it will be seen that the partition is held firmly against the strip 15 by screws 17 which also constitute means for securing a bar of insulating material 18 against the inner marginal portion of the partition.

The governor extends vertically in the larger compartment of the casing and has a shaft 19 which has its upper end journaled in a thrust bearing 20 secured through the upper wall of the casing. The enlarged lower portion 21 of the shaft 19 extends through the neck 10 and is rotatably mounted in a bearing 22 carried by the inner end portion of the neck. This enlarged lower portion of the governor shaft constitutes a coupling for connecting the governor shaft with one end of a flexible drive shaft 23 which is rotatably mounted in a flexible shaft casing 24 carrying a sleeve 25 at its upper end which is secured against the lower end of the neck by the cap or sleeve nut 9. Therefore, when the flexible shaft 23 is rotated, rotary motion will be imparted to the governor shaft. The usual governor weights 26 are pivoted to a collar 27 carried by the upper portion of the governor shaft, and these weights are connected with a lower collar 28 by links 29 so that, when the weights are swung outwardly from the governor shaft by centrifugal force, the lower collar 28 will be drawn upwardly in opposition to action of a helical spring 30 coiled about the governor shaft between the two collars.

The flexible shaft 23 is to be connected with the flexible shaft 31 by means of which the speedometer of the motor vehicle is actuated. In order to do so, there has been provided a driving connection or transmission between the flexible shaft 23 and the shaft 31. This transmission has a casing or housing 32 formed of companion sections which are detachably secured to each other by screws 33 serving to firmly hold the sections together and having their heads perforated to receive a sealing wire 34. Arms 35 and 36 extend from the housing 32 and carry sleeve nuts 37 and 38 in order that the sleeve 39 of the flexible shaft casing 24 and sections of the flexible casing 40 of the speedometer shaft 31 may be securely but detachably held in contact with ends of the arms 35 and 36. A metal shaft 41 is journaled through the housing 32 with its end portion extending through the arm 36 and formed with sockets to receive the squared ends or terminals of the speedometer shaft and this shaft 41 carries a gear 42 which meshes with a smaller gear 43 at the inner end of a shaft 44, the shaft 44 being rotatably mounted through the arm 35 and formed with a socket to receive the squared end of the shaft 23. In view of the fact that the beveled gear 43 is a great deal smaller in diameter than the beveled gear 42, the shaft 23 will be rotated at a higher rate of speed than the shaft 41. In the present illustration the speed ratio of the shafts 23 and 31 is three to one, but it is to be understood that any speed ratio may be provided which will be sufficient to cause the governor shaft to rotate at such a speed that the weight 26 will be moved outwardly by centrifugal force. The sealing wire when passed through the heads of the screws 33 is also passed through ears 45 projecting from the sleeve nuts 37 and 38 and when the seal 47 is applied mechanism within the housing 32 cannot be tampered with by unauthorized persons who may desire to change the speed ratio between the shaft 23 and the speedometer shaft 31.

The circuit opening and closing means is mounted within the smaller compartment of the casing 1 and in the illustrated embodiment of the invention includes movable contacts 48 and 49 formed of resilient steel or other conductive metal which are preferably formed integral with each other and provided with a base portion 50 through which one of the screws 17 passes. Contact points 51 are carried by free ends of the contact strips 48 and 49 and disposed in position to make contact with the companion stationary contacts 52 and 53 which project from the stationary contact plate 54 and consists of terminal portions of the arms of the core 55 of an electromagnet. The winding 56 of the electro-magnet consists of a portion of a wire 58 which is coiled about the core, as shown in Figures 3 and 7, with its end portions extending therefrom. One end of the wire is attached to the terminal post or screw 54' of the contact plate 54 and the other end of the wire is secured to the distributor 60. The post or screw 17 which secures the movable contacts to the bar of insulation has anchored to it one end of the wire 57 leading from the coil 59 and the coil is connected with the distributor 60 by the wire 60'. From an inspection of Figures 4 and 7, it will be readily understood that, when the contact strips 48 and 49 are both out of engagement with the stationary contacts 52 and 53, the circuit supplying current through the distributor to the cylinders of the engine will be broken and operation of the engine brought to a stop. When either of the movable contact strips is in engagement with the companion stationary contact, the circuit through the distributor will be established and the engine will operate. By having the stationary contact points consist of end portions of the core of the electro-magnet, the coil of which forms a portion of the conductor wire 58, the movable contact strips will be urged towards the stationary contacts by attraction of the magnet and movement of the movable contact away from the stationary contacts resisted. This will cause the movable contacts to be firmly held in engagement with the stationary contacts and prevent unintentional separation by vibration or jolt due to an automobile passing over rough places in a road which might have a tendency to cause the resilient movable contacts to be jarred out of engagement with the stationary contacts.

Normally the movable contacts remain in engagement with the stationary contacts and there has been provided key-controlled means for moving the contact strip 48 out of engagement with the stationary contact 52 and governor controlled means for moving the contact strip 49 out of engagement with the stationary contact 53. The governor controlled means has a rocker bar 59 which is pivotally mounted upon a pin 60 carried by bearing arms 61 stamped from the partition 13. At one of its ends the rocker bar has its arm through which the pivot pin passes elongated to form a lever 62 which projects through the opening in the partition formed when cutting the partition to provide the bearing arms 61. This lever extends into the compartment in which the governor is mounted and at its free end carries a roller 63 rotatably mounted at one side of the lever and engaged between the upper and lower flanges of the collar 28 so that, when this collar is shifted longitudinally of the governor shaft by the spring 30 or outward movement of the weight, the rocker bar will be tilted about its pivot pin or axle. An arm 64 extends from the rocker bar towards the contact strip 49 and is provided with side ears 65 between which a strip or bar 66 is pivotally mounted with one end portion extending under the movable contact 49 and carrying a block of insulating material 67 whereby the movable contact may be shifted away from the cooperating stationary contact without direct contact taking place between the bar 66 and the movable contact. The other end portion of the bar 66 also carries a block or pad of insulating material 68 for engagement by a set screw 69 which is threaded through the rocker bar 59, and from an inspection of Figures 3, 4 and 7, it will be readily understood that, when the rocker bar is tilted about its pivot pin 60 as the collar 28 is drawn upwardly by action of the weights, the pad or block 67 will be brought into engagement with the movable contact strip 49 and this contact strip shifted out of engagement with the stationary contact 53. If the movable contact 48 is still in engagement with the stationary contact 52, the circuit through the distributor will not be interrupted but if the movable contact 48 is held out of engagement with the stationary contact 52, movement of the contact 49 out of engagement with the stationary contact 53 will break the ignition circuit and operation of the motor will be stopped. Upward movement of the weights is caused by centrifugal force resulting from increase in the speed at which the governor shaft rotates and as the governor shaft receives its rotation from the speedometer shaft it will be seen that operation of the governor will be in direct response to increases in the speed at which an automobile is driven. By properly adjusting the set screw 69 and securing it in the set position through the medium of its lock nut 70, the speed at which the ignition circuit of the motor is to be broken may be controlled. Therefore, where it is desired by a parent to prevent a juvenile son or daughter from driving the family automobile beyond a certain speed the set screw 69 may be adjusted and when the contact strip 48 is held out of engagement with the stationary contact 52, any attempt to run the automobile at a higher rate than the predetermined speed will cause the ignition circuit to be broken and operation of the engine stopped until the speed has been reduced to the desired speed at which time the spring 30 will force the collar 28 downwardly and act upon the lever 62 to rock the rocker bar and move the arm 66 away from the movable contact strip 49 so that the resiliency of this contact strip may return it into position for engagement with the stationary contact 53.

As previously explained, the circuit through the distributor will only be broken when the contact 48 is out of engagement with the stationary contact 52 and such adjustment for the contact 48 is provided in order that, while a parent may adjust the arm 66 in order to prevent a juvenile driver from operating the automobile beyond a certain speed, the parent or some other adult member of the family may operate the automobile at a higher speed. The means for securing the contact strip 48 out of engagement with the companion stationary contact consists of a lock 71 which is operated through the medium of a key 72 and has a barrel which is secured through the upper wall 14 of the casing 1. The usual lock mechanism is within the barrel and includes a rotatable core which protrudes from the inner end of the barrel and carries a disk 73 from which projects an arm or lug 74. This arm or lug 74 is eccentric to the disk and extends under the movable contact strip 48 so that, when the key is inserted and turned in the proper direction, the arm or lug will act upon the movable contact strip 48 to flex it away from the companion stationary contact 52 and hold it in the adjusted position. In view of the fact that the key is removed after the stationary contact has been moved out of engagement with the companion stationary contact, return of the movable contact into engagement with the stationary contact cannot be affected by an unauthorized person. If the movable contact 48 and the lock controlled adjusting means were omitted, it would be impossible for anyone to drive the automobile or other motor vehicle beyond the predetermined speed for which the set screw 69 is adjusted. This would be particularly desirable upon taxi cabs or buses of public utility companies which are prohibited by traffic regulations from driving in excess of predetermined speed and would also be very desirable in the case of commercial companies who desired to prevent their truck drivers from operating the trucks beyond a certain speed.

The visible speed-indicating means which is provided in order that a police officer may determine whether or not a motor vehicle is exceeding the speed limit consists of a signal of a suitable design which may be mounted upon the top of an automobile or at any point where it can be easily seen and is equipped with two electric lights 75 and 76 of distinctive colors or the signaling means may merely consist of the two lights mounted in a convenient position to be seen. Stationary contacts 77 and 78 are mounted in the casing 1 and connected with the lights 75 and 76 by conductor wires 79 and 80, the contact 77 being adjustably carried by a bracket 81 which has its base portion 82 secured upon the block of insulation 18 by screws 83 and the contact 78 being carried by a contact plate 84. The plate 84 is insulated from the partition by insulating material 85 the same as the plate 54 is insulated from the partition, and in order to insure proper insulation and shielding of the elements carried by the partition from the walls of the casing, there has been provided a sheet of insulating material 86 extending along the inner wall and the lower wall of the casing about margins of the partition. A bracket 87 of conductive material is secured upon the block or bar of insulating material 18 and project laterally therefrom partially across the partition. This bracket extends between the insulating bar or strip and the arm 64 of the rocker bar 59 and has its free end portion stepped towards the partition so that, when the contact strips 88 and 89 which are formed of resilient sheet metal are secured upon the bracket, the rocker bar 59 will extend between them. Free ends of the resilient contact strips carry contact points 90 and 91 and resiliency of the contact strip 88 normally spaces the contact point 90 out of engagement with the contact point 77 while resiliency of the contact strip 89 normally holds the contact point 91 out of engagement with the contact 78. A small block 92 of insulating material is secured upon the side extension 93 of the rocker bar 59 so that, when the rocker bar is tilted in one direction, the contact 90 may be brought into engagement with the contact 77 by action of the tilting rocker bar and at the same time prevent electrical contact between the rocker bar and the contact strip 88. A screw 94 is threaded through the side extension of the rocker bar and at its inner end carries a terminal block 95 of insulating material for engaging the resilient contact strip 89 and moving the contact strip to bring the contact point 91 into engagement with the contact point 78 when the rocker bar is rocked in an opposite direction from which it moves in order to move the contact strip 88 and its point 90 towards the contact 77. By adjusting the screw 94 the time interval between separation of the contact point 90 from the contact 77 and engagement of the point 91 with the contact point 78 may be controlled. A fuse 96 carried by clips 97 connects contact 49 with the bracket 87.

From an inspection of Figure 7, operation of the visible signaling means will be readily understood. Referring to this figure, it will be seen that, when an automobile or other motor vehicle is started and is being driven at not more than a predetermined minimum speed which may be twenty miles an hour, the contact point 90 remains in engagement with the contact 77 and the lamp 75 will be illuminated. This will clearly indicate to a traffic officer that the vehicle is not being driven at a higher rate of speed than permitted in a down-town district where it will be assumed that twenty miles an hour is the limit allowed. By adjusting the threaded contact 77 this contact may be set for any predetermined minimum speed. If the automobile or other vehicle is driven at a higher rate of speed than allowed in the down-town district, upward movement of the governor weight will raise the collar 28 and actuate the lever 62 to rock the rocker bar 59 a sufficient distance to move the contact strip 89 towards the contact 78 and bring the contact 91 into engagement with the contact 78 while the contact 88 and its contact point 90 are moving away from the contact 77. As soon as the contact point 90 moves out of engagement with the contact 77, the lamp 75 will be extinguished and, when the contact point 90 engages the contact point 78, the lamp 76 will be illuminated. This will clearly indicate to a traffic officer that an automobile is being driven in excess of the speed permitted in a down-town district. He need only note the number of the license plate and turn in a report. If, however, the automobile is being operated in a district permitting a higher rate of speed than the down-town district, illumination of the lamp 76 will indicate that the automobile is being operated at no greater speed than permitted in the district through which it is being driven. When the speed of the automobile is increased beyond the predetermined speed for which the screw 94 is set and for which the screw 69 has been adjusted, the resilient contact strip 49 will be shifted in a direction to separate the contact 31 from the companion contact 53 and the distributor circuit will be broken, thus stopping operation of the motor and causing the automobile to reduce its speed. Stopping of the motor will only occur when the contact strip 48 is shifted in a direction to separate its contact 51 from the contact 52 or in case the device is constructed without the contact 48. By properly adjusting the set screws the light 75 may be caused to burn when traveling at a low speed and such an interval provided between extinguishing of the lamp 75 and engagement of the contact 91 with the contact 78 that, when both lamps are extinguished, it may indicate that, while the automobile is being driven at a rate in excess of the speed allowed in a down-town district, it is not being driven at a rate in excess of the speed permitted in an up-town district. Illumination of the lamp 76 will then indicate that the motor vehicle is being driven at a higher rate of speed than permitted in the up-town district but not in excess of speed permitted upon boulevards or in outlying districts and operation of the engine will be brought to a stop when the higher speed permitted is exceeded by breaking of the ignition circuit. It will thus be seen that with this device applied to an automobile or other motor vehicle operation at an excessive rate of speed will be automatically prevented by breaking of the ignition circuit and that, when the automobile is being driven at speeds not sufficient to cause breaking of the ignition circuit, the speed ranges within which the automobile is being driven may be visibly indicated through the medium of the lamps 75 and 76.

Having thus described the invention, what is claimed as new is:

1. A circuit maker and breaker including a pair of movable contacts normally closed, a lock having a rotatable core, a disk carried by said core, a finger carried by said disk eccentric thereto and extending from the disk longitudinally of the core and under one of the movable contacts for moving the said contact to an opened position when the core is turned in one direction and retaining the contact in the opened position, and speed responsive means for effecting opening and closing of the second movable contact.

2. A circuit maker and breaker including a pair of movable contacts normally closed, manually operated means for moving one of the movable contacts to an opening position and retaining said contact in the opened position, and automatic means for moving the second movable contact to an opened position comprising a rocker bar, an arm extending from said rocker laterally of the pivoted mounting for the rocker bar, a lever for said rocker bar, and speed responsive means for actuating said lever and rocking said rocker bar in a direction to move the second movable contact to an opened position.

3. A circuit maker and breaker including a pair of movable contacts normally closed, manually operated means for moving one of the movable contacts to an opening position and retaining said contact in the opened position, automatic means for moving the second movable contact to an opened position comprising a rocker bar, speed responsive means for moving the rocker bar about its pivots, an arm pivoted to said rocker bar and extending therefrom laterally of the pivoted mounting for the bar with its outer end extending under the second movable contact, and means for tilting said arm to shift its outer end towards and away from the second movable contact and cause the movable contact to be moved to an opened position in timed relation to movement of the rocker bar by the speed responsive means.

4. In a circuit maker and breaker, stationary contacts insulated from each other, a pair of movable contacts for cooperating with companion ones of the stationary contacts, one of the movable contacts being normally closed and the other normally in an opened position, a rocker bar pivotally mounted and extending between the movable contacts transversely thereof over one movable contact and under the other movable contact, speed responsive means for rocking said rocker bar to effect closing of the normally open contact and opening of the normally closed contact, and insulated members for engaging the movable contacts carried by said rocker bar and adjustable for effecting opening and closing of the movable contacts in timed relation to each other.

5. In a circuit maker and breaker, stationary contacts insulated from each other, a pair of movable contacts for cooperating with companion ones of the stationary contacts, one of the movable contacts being normally closed and the other normally in an opened position, a rocker bar pivotally mounted and extending between the movable contacts transversely thereof over one movable contact and under the other movable contact, speed responsive means for rocking said rocker bar to effect closing of the normally open contact and opening of the normally closed contact, a third movable contact normally closed, an arm extending from said rocker bar and extending under the third movable contact to effect opening and closing of the third contact as the rocker bar is moved about its pivots.

6. In a circuit maker and breaker, stationary contacts insulated from each other, a pair of movable contacts for cooperating with companion ones of the stationary contacts, one of the movable contacts being normally closed and the other normally in an opened position, a rocker bar pivotally mounted and extending between the movable contacts transversely thereof over one movable contact and under the other movable contact, speed responsive means for rocking said rocker bar to effect closing of the normally open contact and opening of the normally closed contact, a third movable contact normally closed, an arm pivoted to said rocker bar and extending laterally therefrom with its outer end engaged under the third movable contact to effect opening and closing of the third movable contact as the rocker bar is moved, and means for tilting said arm to an adjusted position relative to said rocker bar and thereby causing opening and closing of the third movable contact in predetermined timed relation to opening and closing of the said pair of movable contacts.

OLIPH M. KNIGHT.
WARREN C. LE MIRE.